(12) United States Patent
Dawkins et al.

(10) Patent No.: US 11,792,131 B2
(45) Date of Patent: Oct. 17, 2023

(54) TECHNIQUES FOR RECEIVER ENFORCEMENT OF LOAD-BALANCING STEERING MODE

(71) Applicant: TENCENT AMERICA LLC, Palo Alto, CA (US)

(72) Inventors: Paul Spencer Dawkins, Palo Alto, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 48 days.

(21) Appl. No.: 17/701,887

(22) Filed: Mar. 23, 2022

(65) Prior Publication Data

US 2022/0417162 A1    Dec. 29, 2022

Related U.S. Application Data

(60) Provisional application No. 63/215,891, filed on Jun. 28, 2021.

(51) Int. Cl.
*H04L 47/283* (2022.01)
*H04L 47/122* (2022.01)
*H04L 45/24* (2022.01)

(52) U.S. Cl.
CPC ............ *H04L 47/283* (2013.01); *H04L 45/24* (2013.01); *H04L 47/122* (2013.01)

(58) Field of Classification Search
None
See application file for complete search history.

(56) References Cited

U.S. PATENT DOCUMENTS

| | | | |
|---|---|---|---|
| 11,165,863 B1 | 11/2021 | Timmons et al. | |
| 11,523,305 B2 * | 12/2022 | Grayson | H04W 28/18 |
| 2002/0018476 A1 | 2/2002 | Roy | |
| 2003/0076840 A1 | 4/2003 | Rajagopal et al. | |
| 2004/0264481 A1 | 12/2004 | Darling et al. | |
| 2014/0050150 A1 | 2/2014 | Conte | |

(Continued)

OTHER PUBLICATIONS

International Search Report dated Aug. 2, 2022 in Application No. PCT/US22/28667.

(Continued)

*Primary Examiner* — Anh Ngoc M Nguyen
(74) *Attorney, Agent, or Firm* — Sughrue Mion, PLLC (57) ABSTRACT

A method and a system for traffic load balancing between a multipath-capable receiver within an administrative domain and a multipath-capable sender outside of the administrative domain, performed by at least one processor. The method includes identifying available access networks receiving media streams, accepting steering rules from the administrative domain, incrementing a counter that measures the amount of media streams arriving on the available access networks during a measurement interval, adjusting a delay value based on a timer value, the total amount of media arriving on the access networks, and the steering rules. The timer value may be set to the measurement interval and the measurement interval may be provided in the steering rules. Then, the method includes the multipath-capable sender sending acknowledgments which are delayed according to the adjusted delay value.

20 Claims, 8 Drawing Sheets

(56) References Cited

U.S. PATENT DOCUMENTS

2015/0327139 A1* 11/2015 Sirotkin ................ H04W 76/20
370/332
2016/0036657 A1* 2/2016 Ardeli ................... H04W 48/20
370/235

OTHER PUBLICATIONS

Written Opinion of the International Searching Authority dated Aug. 2, 2022 in Application No. PCT/US22/28667.

* cited by examiner

TECHNIQUES FOR RECEIVER ENFORCEMENT OF LOAD-BALANCING STEERING MODE

CROSS-REFERENCE TO RELATED APPLICATION

This application is based on and claims priority to U.S. Provisional Patent Application No. 63/215,891, filed on Jun. 28, 2021, the disclosure of which is incorporated by reference herein in its entirety.

FIELD

Embodiments of the present disclosure relate to the design and operation of networked computers used for streaming media from a media server to multipath-capable media players, within an administrative domain that imposes load balancing across multiple access networks contained in that administrative domain, when the Media Server is multipath-capable and located outside that administrative domain.

BACKGROUND

Figure 1:
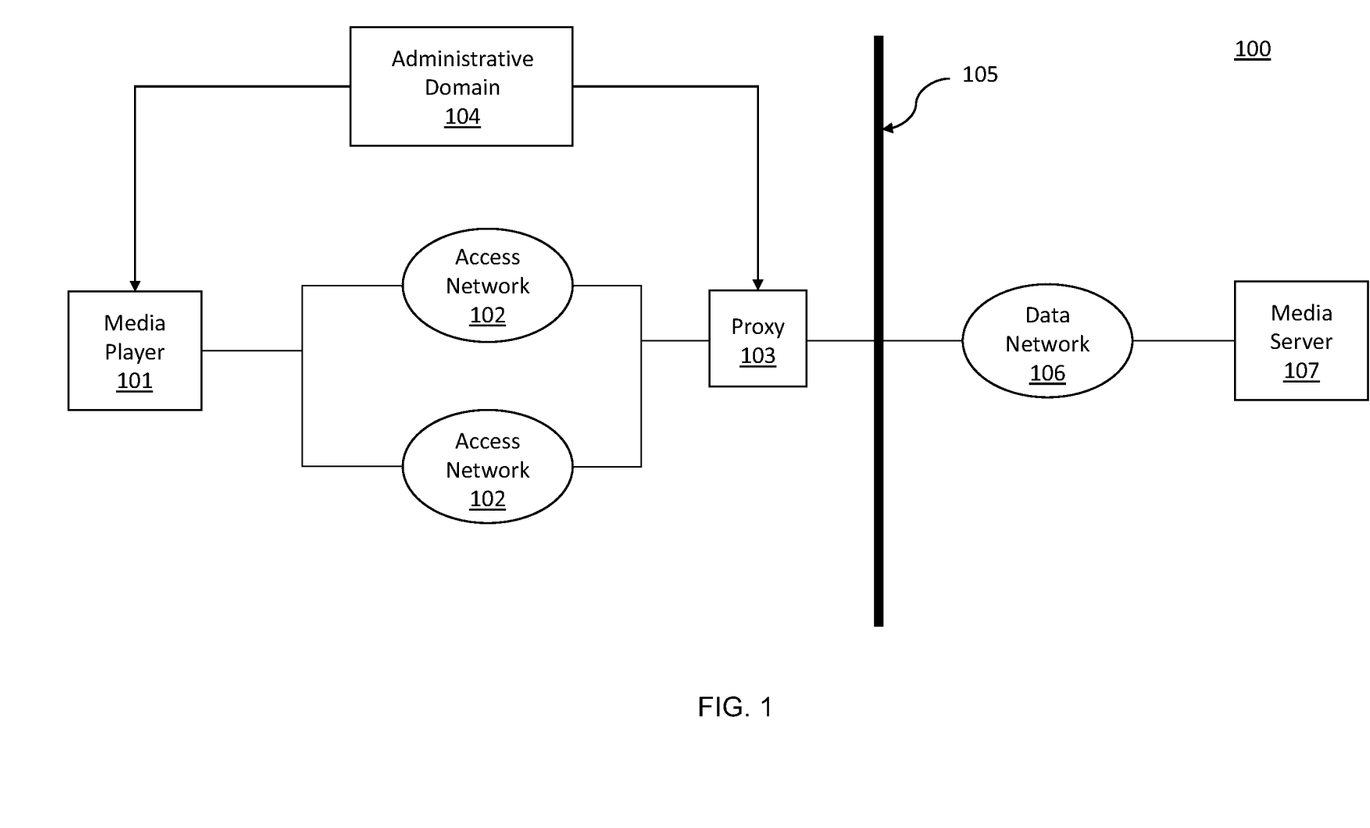
FIG. 1 is a schematic illustration of a multipath-capable media player and non-multipath-capable media server communicating using a multipath proxy.

In related art, a multipath-capable media player and multipath-capable media server may communicate directly with each other. FIG. 1 illustrates a multipath-capable media player and non-multipath-capable media server communicating using a multipath proxy in a communication system 100.

In FIG. 1, a multipath-capable media player (101) and a non-multipath-capable media server (107) may communicate across multiple access networks (102) using a multipath proxy (103). The multipath-capable media player (101) may have multipath functionality. The multipath proxy (103) may perform the role of gathering packets sent from the media player (101) over multiple access networks (102), and distributing packets sent from the media server (107) over a single network path, past a domain border (105), which may span one or more data networks (106). In FIG. 1, only one media player, one multipath proxy, and one media server are depicted. The multipath proxy (103) may have multipath functionality.

In some environments, the characteristics of each available access network (102) may be indistinguishable. Various paths may have significantly different path characteristics, including available bandwidth and capacity, differences in measured round trip times or one-way delays, differences in error rates, priorities, and differences in cost for each path.

The media player (101) and the multipath proxy (103) may use any of a number of steering methods to choose the path they will send packets on, from among the various access networks (102) that are available.

The media player (101) and multipath proxy (103) may each make autonomous decisions about which steering method to use when selecting access networks (102), but in many deployed networks, decisions about steering methods are dictated by the administrative domain providing the multipath capability. The administrative domain (104) provides steering rules to the media player (101) and multipath proxy (103), and the media player (101) and multipath proxy (103) each select among available access networks (102) based on those steering rules.

SUMMARY

One or more example embodiments of the present disclosure provide a system and a method allowing a multipath-capable receiver within an administrative domain to enforce load balancing of that administrative domain on traffic sent by a multipath-capable sender outside of that administrative domain.

According to embodiments, there is provided a method for traffic load balancing between a multipath-capable receiver within an administrative domain and a multipath-capable sender outside of the administrative domain, performed by at least one processor. The method may include identifying access networks for receiving media streams, accepting steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender, incrementing a counter that measures an amount of media streams arriving on the access networks during a measurement interval, adjusting a delay value based on a timer value, the counter, and the steering rules, and sending an acknowledgment based on the delay value.

According to embodiments, there is provided a system for traffic load balancing between a multipath-capable receiver within an administrative domain and a multipath-capable sender outside of the administrative domain. The system may include at least one memory storing instructions and at least one processor configured to read the program code and operate as instructed by the program code. The program code may include identifying code configured to cause the at least one processor to identify access networks for receiving media streams, accepting code configured to cause the at least one processor to accept steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender, incrementing code configured to cause the at least one processor to increment a counter that measures an amount of media streams arriving on the access networks during a measurement interval, adjusting code configured to cause the at least one processor to adjust a delay value based on a timer value, the counter, and the steering rules, and sending code configured to cause the at least one processor to send an acknowledgment based on the delay value.

According to one or more embodiments, there is provided a non-transitory computer-readable medium storing computer code. The computer code may be configured to, when executed by at least one processor, cause the at least one processor to identify access networks for receiving media streams, accept steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender, increment a counter that measures an amount of media streams arriving on the access networks during a measurement interval, adjust a delay value based on a timer value, the counter, and the steering rules, and send an acknowledgment based on the delay value.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and an apparatus for traffic load balancing between a multipath-capable receiver within an administrative domain and a multipath-capable sender outside of the administrative domain.

A variety of steering methods are currently in use, and more steering methods are being proposed in a variety of standards bodies each year. Embodiments of the present disclosure may be applicable when the steering method is a "load balancing" steering method. In the load balancing steering method, a multipath-cable sender may use multiple access networks (102) simultaneously, selecting an access network for each outgoing packet, usually with a desired weight for each access network to describe what proportion of the outgoing packets should be carried over each access network (for example, "Access Network A carries about 70 percent of the packets, and Access Network B carries about 30 percent of the packets"). A simple implementation may use a Weighted Round Robin algorithm to select the access network for the next packet. In some embodiments, implementations more commonly select the access network with the shortest outgoing queue, in order to rely on the network paths with the shortest round trip times more heavily and provide a better user experience.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute computer program code that is stored in a one or more non-transitory computer-readable media.

Figure 2:
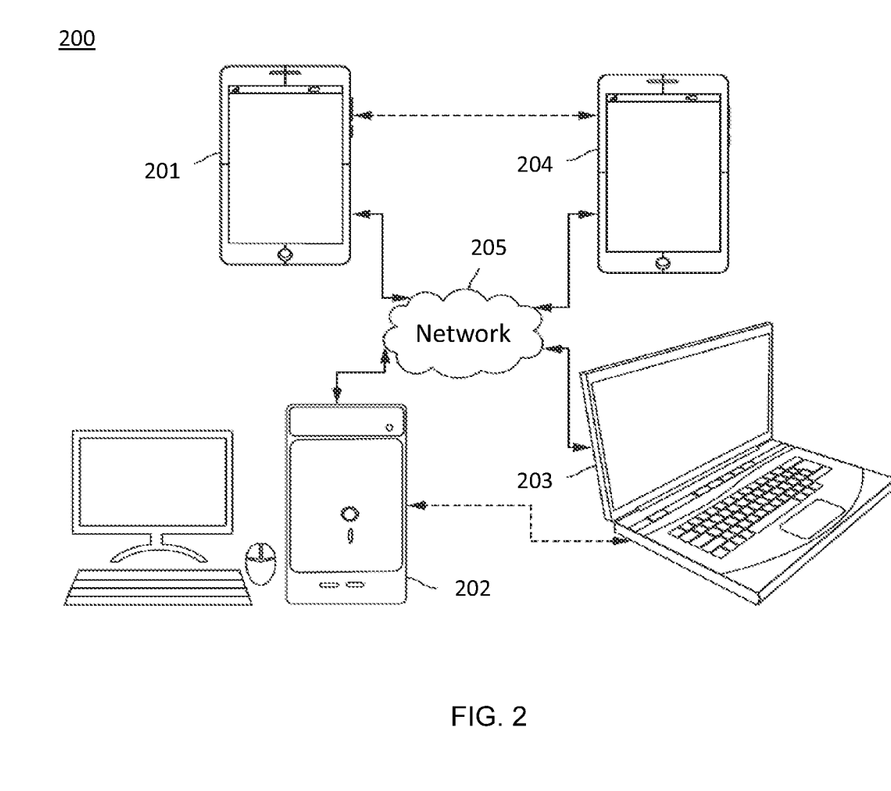
FIG. 2 illustrates a simplified block diagram of a communication system according to one or more embodiments.

FIG. 2 illustrates a simplified block diagram of a communication system 200 according to an embodiment of the present disclosure. The communication system 200 may include at least two terminals 202 and 203 interconnected via a network 205. For unidirectional transmission of data, a first terminal 203 may code video data at a local location for transmission to the other terminal 202 via the network 105. The second terminal 202 may receive the coded video data of the other terminal from the network 205, decode the coded data and display the recovered video data. Unidirectional data transmission may be common in media serving applications and the like.

FIG. 2 illustrates a second pair of terminals 201 and 204 provided to support bidirectional transmission of coded video that may occur, for example, during videoconferencing or media streaming. For bidirectional transmission of data, each terminal 201 and 204 may code video data captured at a local location for transmission to the other terminal via the network 205. Each terminal 201 and 204 also may receive the coded video data transmitted by the other terminal, may decode the coded data and may display the recovered video data at a local display device.

In FIG. 2, the terminals 201, 202, 203 and 204 may be illustrated as servers, personal computers and smart phones but the principles of the present disclosure are not so limited. Embodiments of the present disclosure find application with laptop computers, tablet computers, media players and/or dedicated video conferencing equipment. The network 205 represents any number of networks that convey coded video data among the terminals 201, 202, 203 and 204, including for example wireline and/or wireless communication networks. The communication network 205 may exchange data in circuit-switched and/or packet-switched channels. Representative networks include telecommunications networks, local area networks, wide area networks and/or the Internet. For the purposes of the present discussion, the architecture and topology of the network 205 may be immaterial to the operation of the present disclosure unless explained herein below.

Figure 3:
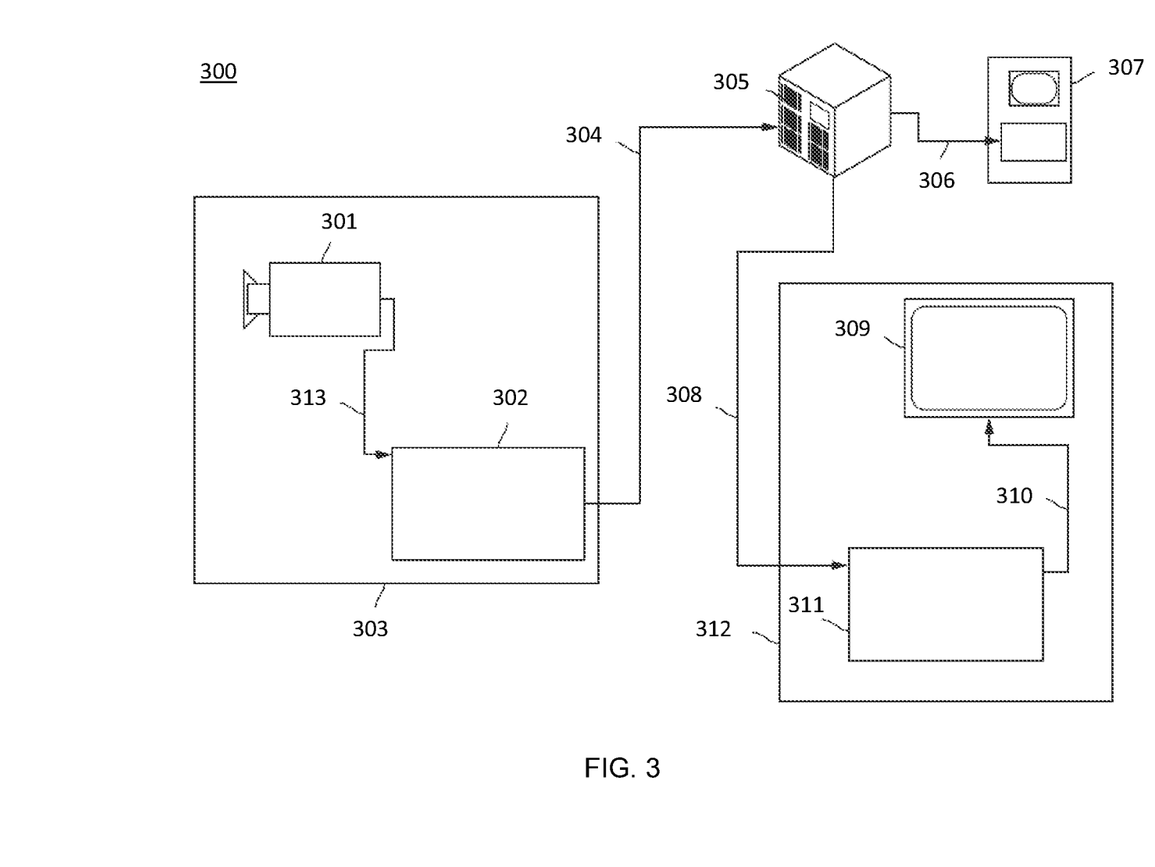
FIG. 3 is a schematic illustration of an exemplary streaming environment according to one or more embodiments.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 303, that can include a video source 301, for example a digital camera, creating, for example, an uncompressed video sample stream 313. That sample stream 313 may be emphasized as a high data volume when compared to encoded video bitstreams and can be processed by an encoder 302 coupled to the camera 301. The encoder 302 can include hardware, software, or a combination thereof to enable or implement aspects of the disclosed subject matter as described in more detail below. The encoded video bitstream 304, which may be emphasized as a lower data volume when compared to the sample stream, can be stored on a streaming server 305 for future use. One or more streaming clients 312 and 307 can access the streaming server 305 to retrieve copies 308 and 306 of the encoded video bitstream 304. A client 312 can include a video decoder 311 which decodes the incoming copy of the encoded video bitstream 308 and creates an outgoing video sample stream 310 that can be rendered on a display 309 or other rendering device. In some streaming systems, the video bitstreams 304, 306 and 308 can be encoded according to certain video coding/compression standards. Examples of those standards are noted above and described further herein.

Figure 4:
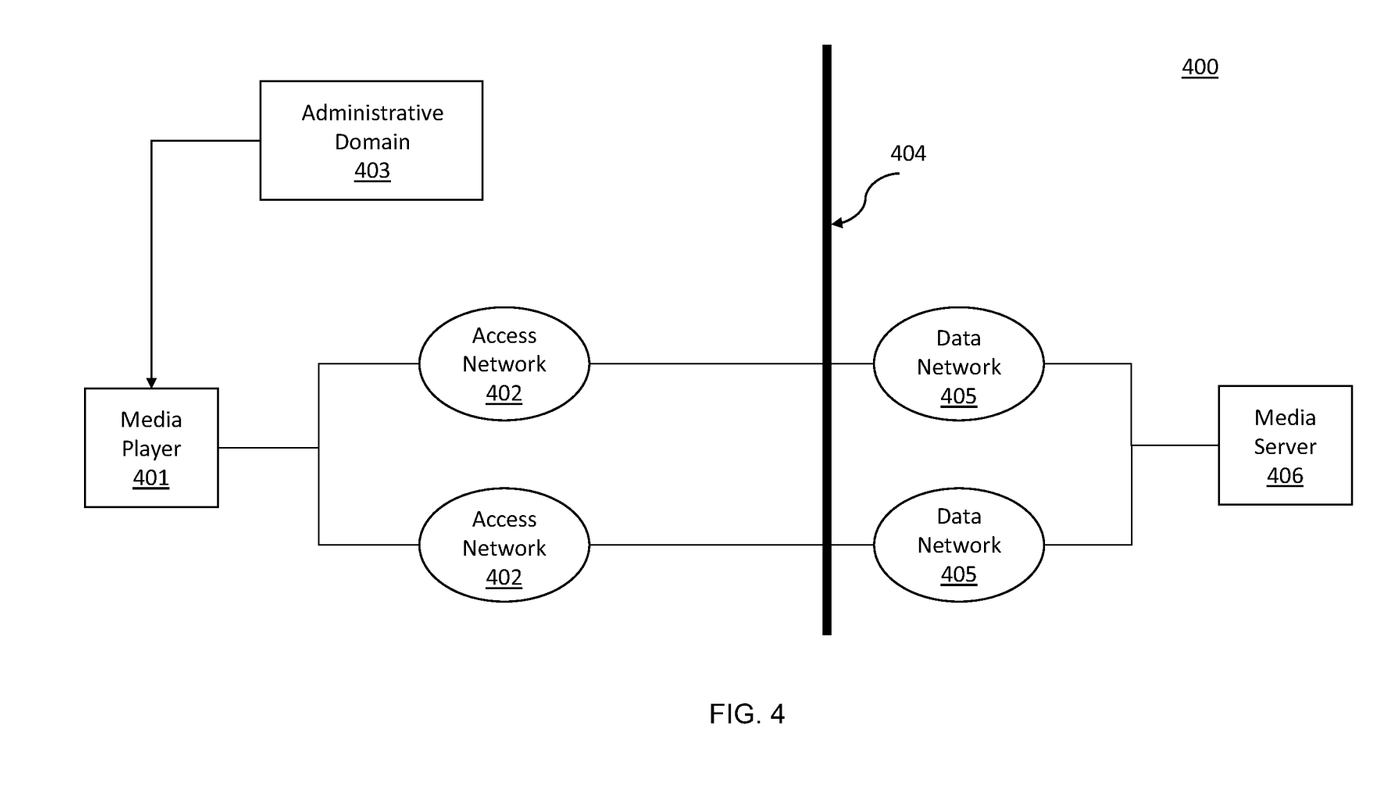
FIG. 4 is a schematic illustration of a multipath-capable media player and multipath-capable media server communicating according to embodiments.

FIG. 4 illustrates an example communication system 400. The communication network 400 includes a multipath-capable media player (hereafter media player) 401, access networks 402, an administrative domain 403, a domain boarder 404, data networks 405, and a multipath-capable media server (hereafter media server) 406.

According to embodiments, there is no longer any need for a multipath proxy to perform protocol conversions. In FIG. 1, the multipath proxy 103 enforced the steering rules in the communication network 100. Since such a multipath proxy is not present in the communication network 400 and the multipath-capable media server is outside the administrative boundary (i.e., outside the domain boarder 404) for that administrative domain 403, the administrative domain 403 may not provide domain steering rules to the media server 406. While the administrative domain 403 may still provide steering rules to the media player 401, this will not directly affect the way the media server 406 uses the multiple network paths that are available to it, and the media content from the media server 406 will be much greater than the amount of traffic sent from the media player 401. As such, a way to compel the media server 406 to perform "load balancing" across those multiple network paths without requiring direct instruction from within the administrative domain is needed.

According to embodiments, this may be performed using receiver enforcement in available access networks in the multiple network paths (402, 405). A detailed description according to embodiments will now be described with reference to FIG. 5.

Figure 5:
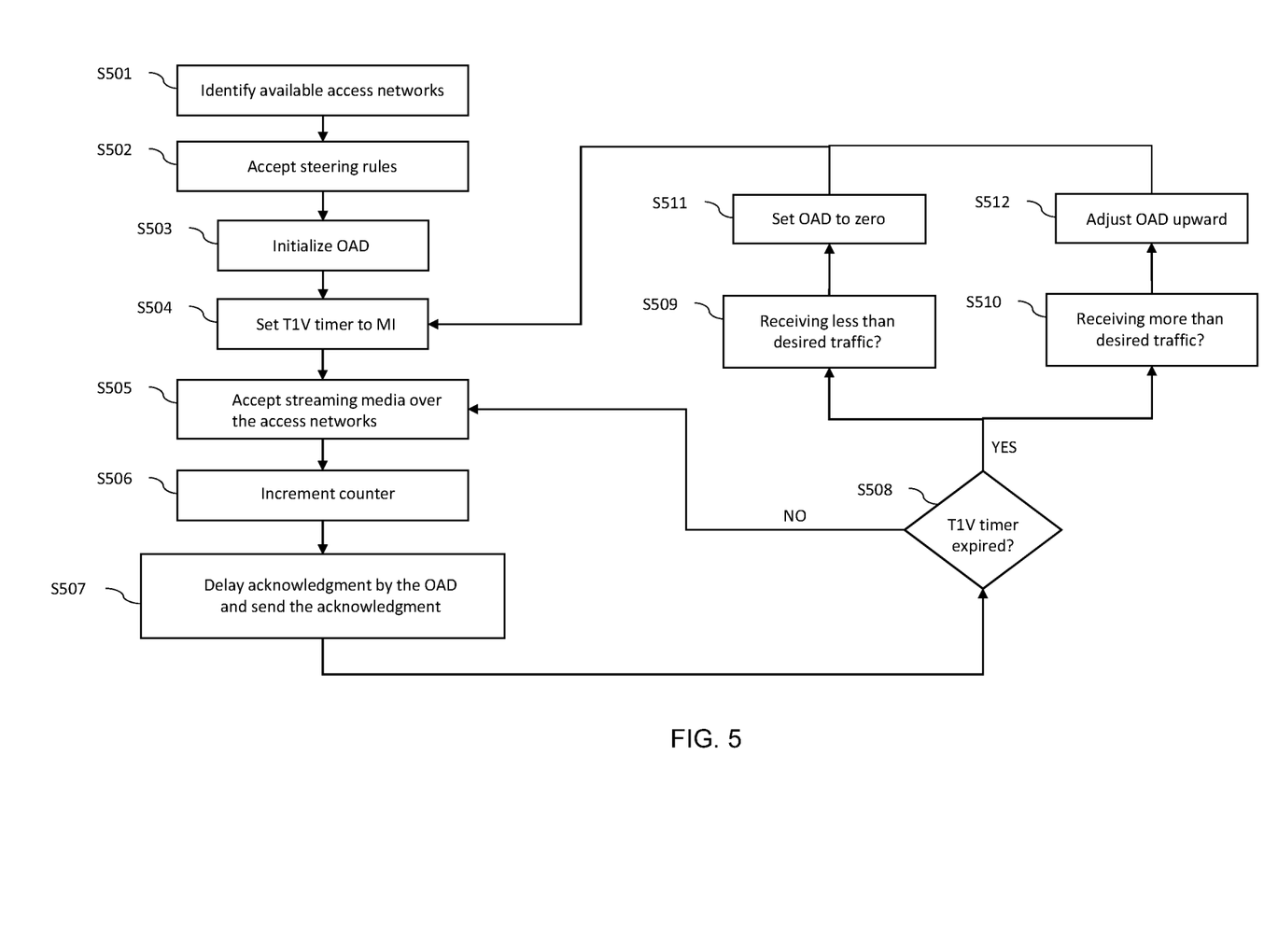
FIG. 5 illustrates an exemplary flowchart for load balancing across network paths according to embodiments.

FIG. 5 illustrates an exemplary flowchart 500 for receiver enforcement of Access Traffic Steering-Switching-Splitting (ATSSS) load balancing in accordance with embodiments. In embodiments, the steps of flowchart 500 may be performed by, for example, the communication system 400.

At S501, the media player 401 may identify all the available access networks 402 in the communication system 400. In some embodiments, the media player 401 selects a set of initial access networks from the available access networks 402. The set of initial access networks will be receiving media streams from the media server 406.

Then, at S502, the media player 401 accepts a steering rule from the administrative domain 403. The accepted steering rule will control the media player's 401 use of the available access networks 402. If the steering rule is "load balancing", the media player 401 proceeds to use the procedures described in steps S503-S509.

For each of the available access networks 402, the media player 401 initializes an Outgoing Acknowledgment Delay value (OAD) to zero (S503). At S504, the media player 401 initializes a T1 Timer value (T1V) by setting it to a measurement interval (MI). The MI controls the interval between adjustments to the OAD values for each of the access networks 402. The MI value may be selected by implementers or may be provided as part of the steering rules provided by the administrative domain 403. The MI value may be adjusted as a network operator gains experience with the mechanism in their own network.

At S505, the media player 401 accepts streaming media from the media server 406 over the available access networks 402.

At S506, the media player 401 increments a counter that measures the amount of streaming media arriving on each of the access networks 402 during the MI. The amount of streaming media may be measured in packets, bytes, or in other units of measure that provide acceptable enforcement of the load balancing proportions specified in the steering rule.

As the media player 401 prepares to send an acknowledgement to the media server 406, at S507, the media player 401 delays each outgoing acknowledgement by the value of the OAD. The acknowledgement increases the transmission window and allows more media to be sent across the access networks 402.

When the T1V timer expires (YES at S508), the media player 401 compares the proportion of the total amount of media that has arrived on each of the access networks 402 during the MI to the desired proportion of media specified in the steering rule (i.e., proceeds to S509-S510). If the T1V timer has not expired (NO at S508), the media player 401 continues to receive streaming media over the networks and the process repeats through S505-S508.

If the observed proportion of traffic is not acceptably close to the proportion specified in the steering rules, or within a predetermined amount, the media player 401 may adjust the OADs values. If an adjustment is not necessary, the media player 401 may resume the processing loop and returns to S504.

If one or more of the access networks 402 are receiving less than their desired proportion of traffic (S509), the media player 401 may set the OADs to zero (S511). If one or more of the access networks 402 are carrying more than their desired proportion of traffic (S510), the media player 401 may adjust the OADs upward or increase the OAD (S512). After the adjustment at either S511 or S512, the process returns to S504.

When the media player 401 waits to send the acknowledgement, this has the effect of making the over utilized paths (i.e., paths carrying more than their desired proportion of traffic) appear to have lower capacity. Therefore, a multipath transport protocol implementation will tend to queue more traffic for the underutilized paths (i.e., paths carrying less than their desired proportion of traffic), and thus move the traffic flow closer to the designed weighting. This solution may be applicable when any number of access networks are available between a media server and a media player, and when additional access networks become available or unavailable. The receiver enforcement of load balancing described above, according to embodiments, may be applied to the set of active access networks.

Figure 6:
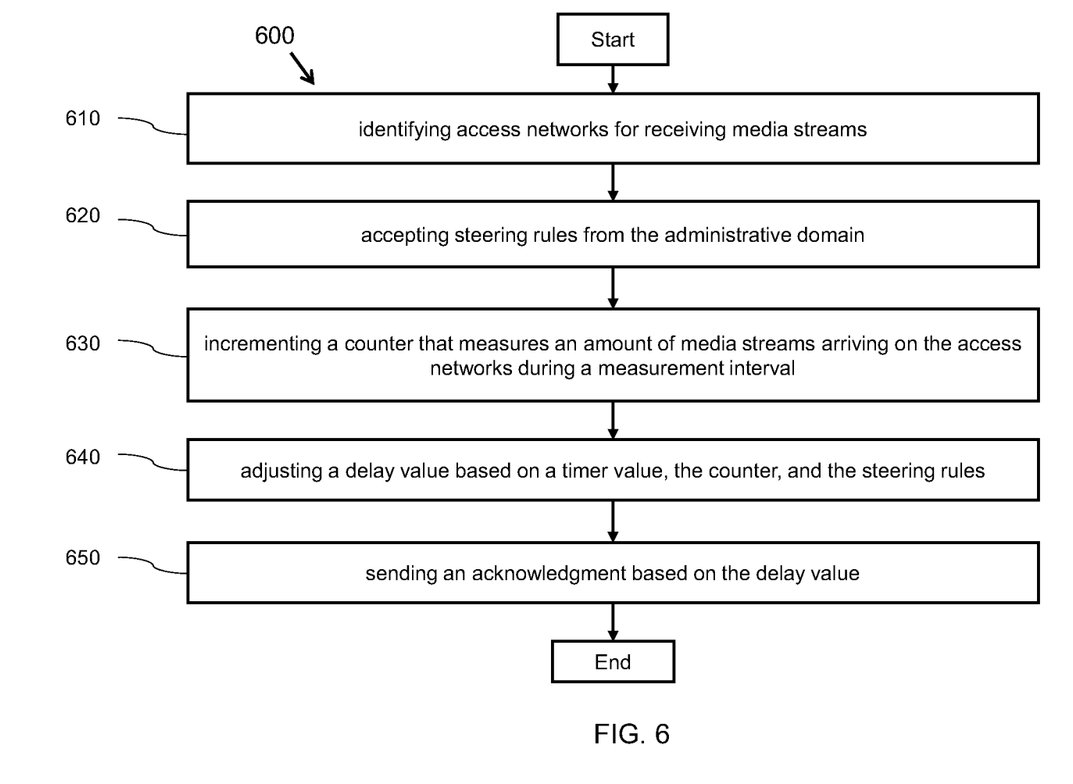
FIG. 6 is a flowchart of a method for traffic load balancing between a multipath-capable receiver and a multipath-capable sender, according to one or more embodiments.

FIG. 6 is a flowchart of a method 600 for traffic load balancing between a multipath-capable receiver within an administrative domain and a multipath-capable sender outside of the administrative domain, according to one or more embodiments. That is, the administrative domain includes the multipath-capable receiver but not the multipath-capable sender.

As shown in FIG. 6, in operation 610, the method 600 may include identifying access networks for receiving media streams.

In operation 620, the method 600 may include accepting steering rules from the administrative domain, wherein the steering rules facilitate steering the traffic associated with the media streams between the multipath-capable receiver and the multipath-capable sender.

In operation 630, the method 600 may include incrementing a counter that measures an amount of media streams arriving on the access networks during a measurement interval.

In operation 640, the method 600 may include adjusting a delay value based on a timer value, the counter, and the steering rules.

In operation 650, the method 600 may include sending an acknowledgment based on the delay value.

Although FIG. 6 shows example blocks of the method, in some implementations, the method may include additional blocks, fewer blocks, different blocks, or differently arranged blocks than those depicted in FIG. 6. Additionally, or alternatively, two or more of the blocks of the method may performed in parallel.

Figure 7:
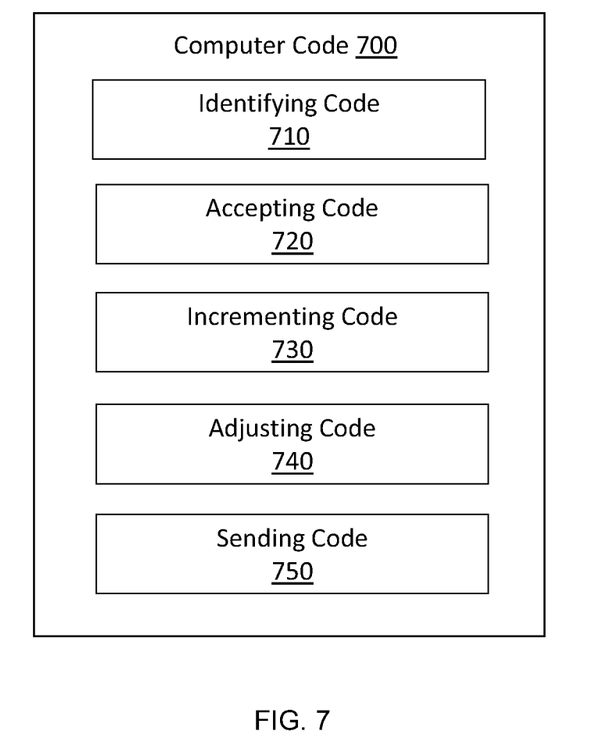
FIG. 7 is a block diagram of an example of computer code for traffic load balancing between a multipath-capable receiver and a multipath-capable sender, according to one or more embodiments.

FIG. 7 is a block diagram of an example of computer code for identifying segment boundaries in segments with a unique start code, according to one or more embodiments.

According to embodiments of the present disclosure, at least one processor with memory storing computer code may be provided. The computer code may be configured to, when executed by the at least one processor, perform any number of aspects of the present disclosure.

As shown in FIG. 7, the computer code 700 may include identifying code 710, accepting code 720, incrementing code 730, adjusting code 740, and sending code 750.

The identifying code 710 may be configured to cause the at least one processor to identify access networks for receiving media streams.

The accepting code 720 may be configured to cause the at least one processor to accept steering rules from the administrative domain, wherein the administrative domain includes the multipath-capable receiver but not the multipath-capable sender and the steering rules facilitate steering the traffic associated with the media streams between the multipath-capable receiver and the multipath-capable sender.

The incrementing code 730 may be configured to cause the at least one processor to increment a counter that measures an amount of media streams arriving on the access networks during a measurement interval The adjusting code 740 may be configured to cause the at least one processor to adjust a delay value based on a timer value, the amount of media streams arriving on the access networks during the measurement interval, and the steering rules.

The sending code 750 may be configured to cause the at least one processor to send an acknowledgment based on the adjusted delay value.

Although FIG. 7 shows example blocks of the computer code 700 of an system or device according to embodiments, in some implementations, the system may include additional blocks, fewer blocks, different blocks, or differently arranged blocks than those depicted in FIG. 7. Additionally, or alternatively, two or more of the blocks of the system may be combined. In other words, while FIG. 7 shows distinct blocks of code, the various code instructions need not be distinct and could be intermingled.

The techniques for receiver enforcement of load-balancing steering mode, described above, may be implemented in receivers as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 8:
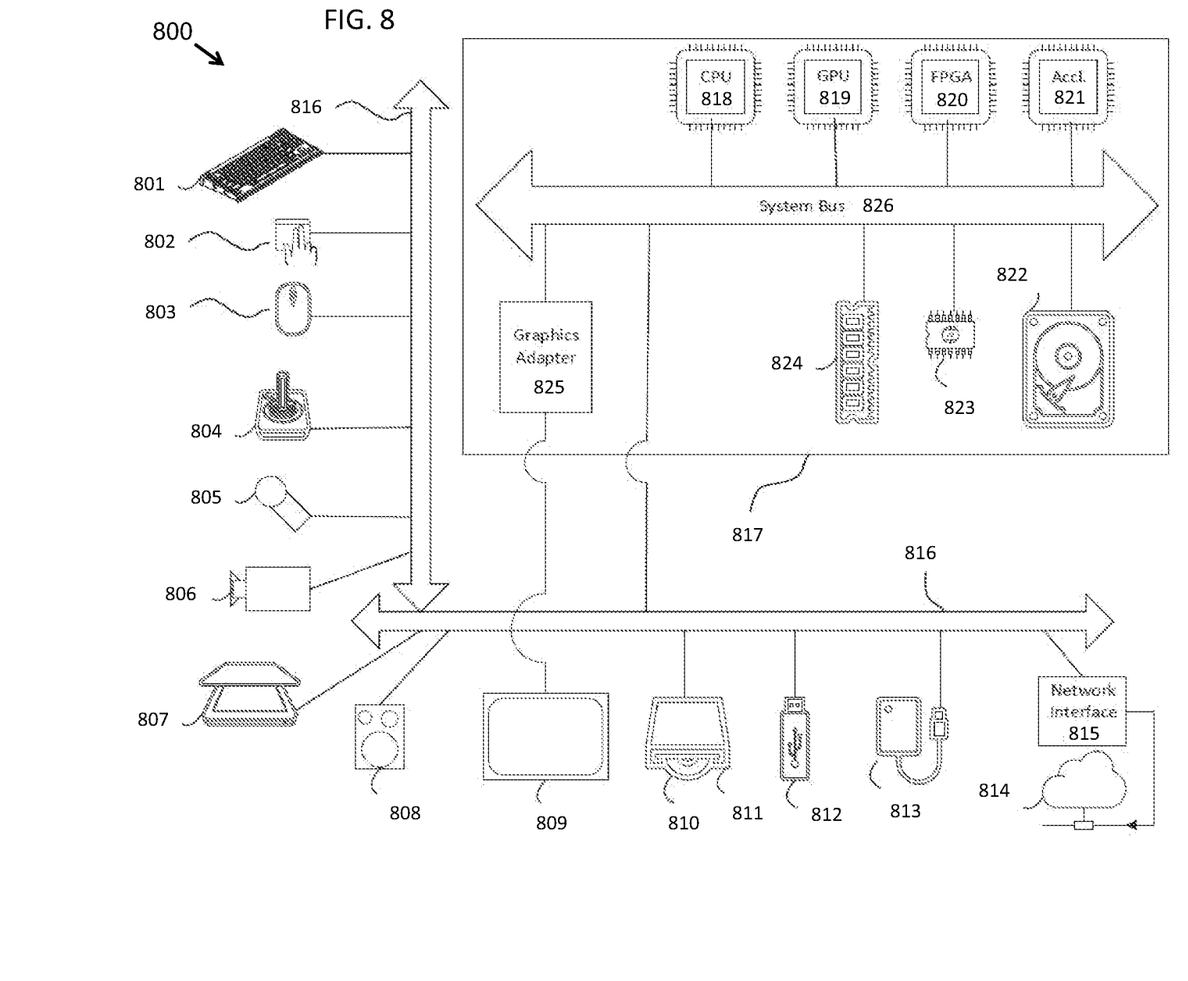
FIG. 8 is a schematic illustration of a computer system, according to one or more embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 801, trackpad 802, mouse 803, touch-screen 809, data-glove, joystick 804, microphone 805, camera 806, scanner 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 809, data-glove, or joystick 804, but there can also be tactile feedback devices that do not serve as input devices), audio output devices (such as: speakers 808, headphones), visual output devices (such as screens 809 to include CRT screens, LCD screens, plasma screens, OLED screens, each with or without touch-screen input capability, each with or without tactile feedback capability— some of which may be capable to output two-dimensional visual output or more than three-dimensional output through means such as stereographic output; virtual-reality glasses, holographic displays and smoke tanks), and printers.

Computer system 800 can also include human accessible storage devices and their associated media such as optical media including CD/DVD ROM/RW 811 with CD/DVD or the like media 810, thumb-drive 812, removable hard drive or solid-state drive 813, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 800 can also include an interface 815 to one or more communication networks 814. Networks 814 can, for example, be wireless, wireline, optical. Networks 814 can further be local, wide-area, metropolitan, vehicular and industrial, real-time, delay-tolerant, and so on. Examples of networks 814 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 814 commonly require external network interface adapters (e.g., graphics adapter 825) that attached to certain general-purpose data ports or peripheral buses 816 (such as, for example, USB ports of the computer system 800; others are commonly integrated into the core of the computer system 800 by attachment to a system bus as described below (for example Ethernet interface into a PC computer system or cellular network interface into a smartphone computer system). Using any of these networks 814, computer system 800 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 817 of the computer system 800.

The core 817 can include one or more Central Processing Units (CPU) 818, Graphics Processing Units (GPU) 819, specialized programmable processing units in the form of Field Programmable Gate Areas (FPGA) 820, hardware accelerators 821 for certain tasks, and so forth. These devices, along with Read-only memory (ROM) 823, Random-access memory (RAM) 824, internal mass storage such as internal non-user accessible hard drives, SSDs, and the like 822, may be connected through a system bus 826. In some computer systems, the system bus 826 can be accessible in the form of one or more physical plugs to enable extensions by additional CPUs, GPU, and the like. The peripheral devices can be attached either directly to the core's system bus 826, or through a peripheral bus 816. Architectures for a peripheral bus include PCI, USB, and the like.

CPUs 818, GPUs 819, FPGAs 820, and accelerators 821 can execute certain instructions that, in combination, can make up the aforementioned computer code. That computer code can be stored in ROM 823 or RAM 824. Transitional data can be also be stored in RAM 824, whereas permanent data can be stored, for example, in the internal mass storage 822. Fast storage and retrieval to any of the memory devices can be enabled through the use of cache memory, which can be closely associated with one or more CPU 818, GPU 819, mass storage 822, ROM 823, RAM 824 and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 800, and specifically the core 817 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 817 that are of non-transitory nature, such as core-internal mass storage 822 or ROM 823. The software implementing various embodiments of the present disclosure can be stored in such devices and executed by core 817. A computer-readable medium can include one or more memory devices or chips, according to particular needs. The software can cause the core 817 and specifically the processors therein (including CPU, GPU, FPGA, and the like) to execute particular processes or particular parts of particular processes described herein, including defining data structures stored in RAM 824 and modifying such data structures according to the processes defined by the software. In addition or as an alternative, the computer system can provide functionality as a result of logic hardwired or otherwise embodied in a circuit (for example, accelerator 821), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for traffic load balancing between a multipath-capable receiver within an administrative domain and a multipath-capable sender outside of the administrative domain, performed by at least one processor and comprising:
    identifying access networks for receiving media streams;
    accepting steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender;
    incrementing a counter that measures an amount of media streams arriving on the access networks during a measurement interval;
    adjusting a delay value based on a timer value, the counter, and the steering rules; and
    sending an acknowledgment based on the delay value.

2. The method of claim 1, further comprising initializing the delay value to zero and initializing the timer value to the measurement interval.

3. The method of claim 1, wherein the timer value determines an interval between adjustments to the delay value for the access networks.

4. The method of claim 1, wherein the measurement interval is provided in the steering rules.

5. The method of claim 1, wherein the acknowledgment indicates an adjustment level to the amount of media steams arriving on the access networks during the measurement interval.

6. The method of claim 1, further comprising setting the delay value for the access networks receiving less than a predetermined amount of media streams to zero, based on a total amount of media streams that have arrived during the measurement interval,
wherein the predetermined amount of media streams is defined by the steering rules.

7. The method of claim 1, further comprising, further comprising increasing the delay value for access networks receiving more than a predetermined amount of media streams, based on a total amount of media streams that have arrived during the measurement interval,
wherein the predetermined amount of media streams is defined by the steering rules.

8. A system for traffic load balancing between a multipath-capable receiver within an administrative domain and a multipath-capable sender outside of the administrative domain, the system comprising:
at least one memory configured to store program code; and
at least one processor configured to read the program code and operate as instructed by the program code, the program code including:
identifying code configured to cause the at least one processor to identify access networks for receiving media streams;
accepting code configured to cause the at least one processor to accept steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender;
incrementing code configured to cause the at least one processor to increment a counter that measures an amount of media streams arriving on the access networks during a measurement interval;
adjusting code configured to cause the at least one processor to adjust a delay value based on a timer value, the counter, and the steering rules; and
sending code configured to cause the at least one processor to send an acknowledgment based on the delay value.

9. The system of claim 8, the program code further including initializing code configured to cause the at least one processor to initialize the delay value to zero and initializing the timer value to the measurement interval.

10. The system of claim 8, wherein the timer value determines an interval between adjustments to the delay value for the access networks.

11. The system of claim 8, wherein the measurement interval is provided in the steering rules.

12. The system of claim 8, wherein the acknowledgment indicates an adjustment level to the amount of media steams arriving on the access networks during the measurement interval.

13. The system of claim 8, wherein the adjusting code is further configured to cause the at least one processor to set the delay value for access networks receiving less than a predetermined amount of media streams to zero, based on a total amount of media streams that have arrived during the measurement interval,
wherein the predetermined amount of media streams is defined by the steering rules.

14. The system of claim 8, wherein the adjusting code is further configured to cause the at least one processor to increase the delay value for access networks receiving more than a predetermined amount of media streams, based on a total amount of media streams that have arrived during the measurement interval,
wherein the predetermined amount of media streams is defined by the steering rules.

15. A non-transitory computer readable medium storing instructions, the instructions comprising: one or more instructions that, when executed by at least one processor of a system for traffic load balancing between a multipath-capable receiver within an administrative domain and a multipath-capable sender outside of the administrative domain storing instructions that, cause the at least one processor to:
identify access networks for receiving media streams;
accept steering rules from the administrative domain, wherein the administrative domain includes the multipath-capable receiver but not the multipath-capable sender, and wherein the steering rules facilitate steering the traffic associated with the media streams between the multipath-capable receiver and the multipath-capable sender;
increment a counter that measures an amount of media streams arriving on the access networks during a measurement interval;
adjust a delay value based on a timer value, the counter, and the steering rules; and
send an acknowledgment based on the delay value.

16. The non-transitory computer readable medium of claim 15, wherein the instructions further cause the at least one processor to initialize the delay value to zero and initializing the timer value to the measurement interval.

17. The non-transitory computer readable medium of claim 15, wherein the timer value determines an interval between adjustments to the delay value for the access networks.

18. The non-transitory computer readable medium of claim 15, wherein the measurement interval is provided in the steering rules.

19. The non-transitory computer readable medium of claim 15, wherein the acknowledgment indicates an adjustment level to the amount of media steams arriving on the access networks during the measurement interval.

20. The non-transitory computer readable medium of claim 15, wherein the instructions further cause the at least one processor to:
set the delay value for access networks receiving less than a first predetermined amount of media streams to zero and increase the delay value for access networks receiving more than a second predetermined amount of media streams, based on a total amount of media streams that have arrived during the measurement interval,
wherein the predetermined amount of media streams is defined by the steering rules.

* * * * *